April 19, 1966          H. KLING          3,246,841
HEATER DEVICE FOR MOTOR VEHICLE CARBURETORS
Original Filed Dec. 9, 1959
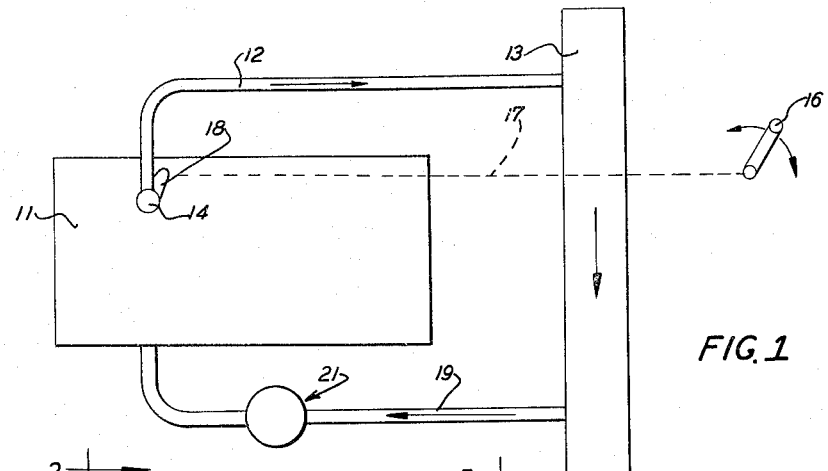
FIG. 1
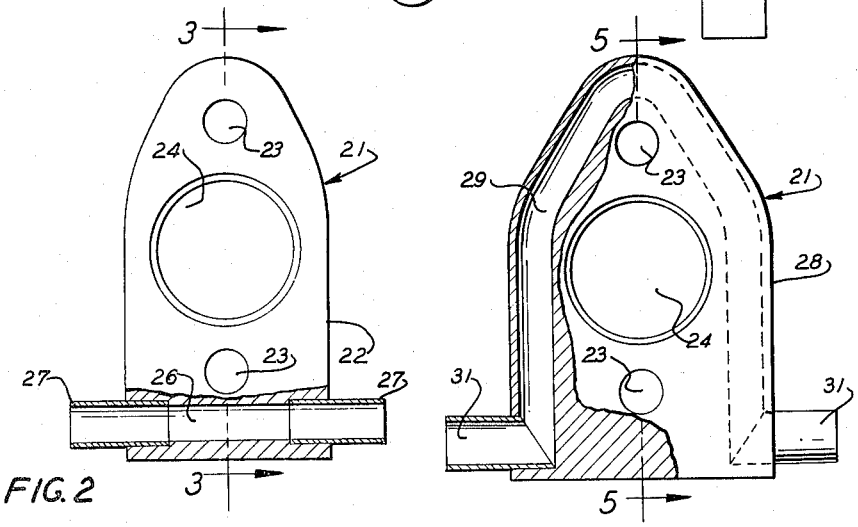
FIG. 2          FIG. 4
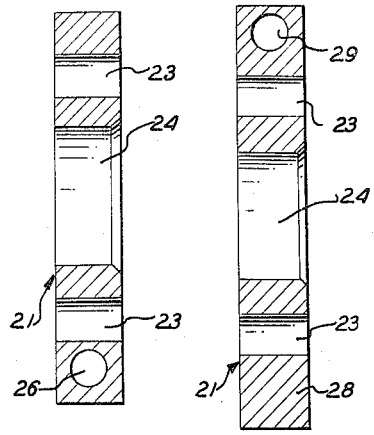
FIG. 3      FIG. 5
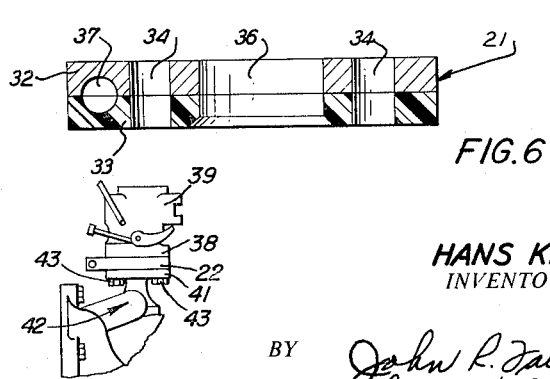
FIG. 6
FIG. 7
HANS KLING
INVENTOR.
BY
ATTORNEYS

United States Patent Office 3,246,841
Patented Apr. 19, 1966

3,246,841
HEATER DEVICE FOR MOTOR VEHICLE CARBURETORS
Hans Kling, Cologne, Germany, assignor to Ford Motor Company, Dearborn, Mich., a corporation of Delaware
Continuation of application Ser. No. 858,483, Dec. 9, 1959. This application Nov. 1, 1961, Ser. No. 200,007
Claims priority, application Germany, Jan. 12, 1959, F 27,454
4 Claims. (Cl. 237—12.3)

This application is a continuation of application Serial No. 858,483, filed December 9, 1959, and now abandoned.

This invention relates to a means for heating up the carburetor of an internal combustion engine to avoid icing or frosting of the carburetor.

Under certain atmospheric conditions of high humidity and low temperature, water vapor present in the air drawn through the carburetor freezes due to the evaporation of the gasoline which rapidly lowers the temperature of the air. Various means have been tried to prevent carbureor icing such as warmed air, electric current and heated engine coolant. Heated engine coolant appears to be the best solution for the prevention of carburetor icing. It is, therefore, an object of this invention to provide a novel means utilizing the engine coolant by which carburetor icing is prevented.

It is a further object of this invention to provide means disposed between the carburetor and the intake manifold through which engine coolant is circulated to prevent carburetor icing.

Still another object is to provide a disk having an internal passage through which the engine coolant passes, the disk being made of a material of high heat conducting capacity.

Still a further object is to provide a pair of disks disposed between the intake manifold and the carburetor through which engine coolant passes, one of the disks being made from a material of a high heat conducting capacity and the other of the disks being made from a material of low heat conducting capacity; the high heat conducting capacity disk disposed adjacent to the carburetor and the low heat conducting capacity disk being disposed adjacent to the intake manifold.

Other objects and advantages of this invention will be made more apparent as this description proceeds particularly when considered in connection with the accompanying drawings in which:

FIGURE 1 is a schematic view of parts showing an arrangement embodying the invention;
FIGURE 2 is a plan view, partly in section, of a disk made in accordance with this invention;
FIGURE 3 is a cross sectional view taken on the plane indicated by line 3—3 of FIGURE 2;
FIGURE 4 is a plan view partly in section, of an alternate form of disk;
FIGURE 5 is a cross sectional view taken on the plane indicated at line 5—5 of FIGURE 4; and
FIGURE 6 is a cross sectional view similar to FIGURES 3 and 5 and showing still another alternate form of disk made from two pieces of different materials.
FIGURE 7 is a fragmentary side elevational view of a heater disk assembled between the carburetor and the intake manifold of an engine.

Referring now to the drawings and in particular to FIGURE 1. An internal combustion engine is shown indicated at 11 from which heated engine coolant passes through conduit 12 leading to heat exchanger 13 such as a heater core. A regulating valve 14 used to control the heater is disposed between the engine 11 and the conduit 12. It is operated by a switch 16 which is connected by bowden cable 17 to lever arm 18, which operates the regulating valve 14, to regulate the flow of coolant from the engine to the heat exchanger. A conduit 19 carries the coolant from the heat exchanger 13 to the intermediate disk indicated generally at 21 and back to the inlet side of the engine 11. If desired, regulating valve 14, switch 16, cable 17, and arm 18 may be deleted so that the fluid will continously pass through disk 21.

Referring now to FIGURES 2, 3 and 7, the disk 21 is in the form of a spacer body 22 which fits between the lower flange 38 of the carburetor 39 and the upper flange 41 of the intake manifold 42. The attachment of the carburetor to the intake manifold is done by bolts 43 which extend through apertures 23 in the body 22. Disk 21 may be made from a material having a high thermal conductivity such as aluminum and is provided with the usual bore 24 which is axially aligned with like openings in the carburetor and in the intake manifold. A passage 26 is provided at one end of the body 22 through which the coolant passes. Passage 26 may be counterbored to receive pipe portions 27 to which the conduit 19 is secured. In this embodiment, the coolant is passed through one end of the disk body and the heat from the coolant is conducted through the body warming up the carburetor portion in contact with the body.

In FIGURES 4 and 5 an alternate embodiment is shown in which the body 28 is provided with a passage 29 generally U-shaped in configuration with the bore 24 and apertures 23 disposed within the U-shaped area of the passage 29. Passage 29 is counterbored at each end for the reception of pipe portions 31 for the attachment to the conduit 19. In the embodiment shown in FIGURES 4 and 5, it is to be noted that the length of the passage 29 is in multiples of the distance between the two pipe sections 31. Body 28 is also made from a material having a high thermal conductivity.

The embodiment shown in FIGURE 6 discloses a disk comprised of an upper and lower body 32, and 33, respectively. Each of the bodies is provided with a portion of the attachment apertures 34, bore 36 and coolant passage 37. The coolant passage 37 is shown in the form of FIGURES 2 and 3 but may also be made in the form shown in FIGURES 4 and 5. Upper body 32 is adjacent to the carburetor flange and is made from a material of high heat conducting capacity, while the lower body 33 is adjacent to the intake manifold and is made from a material of low heat conducting capacity such as a plastic. It can be seen, therefore, with this design that the carburetor and the intake manifold will not be thermally connected thereby preventing undue heating of the gasoline in the carburetor.

What is claimed is:

1. In a motor vehicle, a liquid coolant cooled internal combustion engine, an intake manifold, a carburetor, a liquid coolant heated anti-icing device provided with a liquid coolant passage, a liquid coolant operated cab heater, a valve for the regulation of the flow of liquid coolant from the engine to the cab heater, and means connecting the cooling passages of the liquid coolant cooled internal combustion engine, the valve for the regulation of the flow of liquid coolant to the cab heater, the cab heater and the coolant passage of said liquid coolant heated anti-icing device in series so that the valve which regulates the flow of liquid coolant to the cab heater also regulates the flow of liquid coolant to the anti-icing device.

2. In a motor vehicle, a liquid coolant cooled internal combustion engine, an intake manifold, a carburetor, a liquid coolant heated anti-icing device provided with a liquid coolant passage, a liquid coolant operated cab heater, a valve for the regulation of the flow of liquid coolant from the engine to the cab heater, and means connecting the cooling passages of the liquid coolant cooled internal combustion engine, the valve for the regulation of the flow of liquid coolant to the cab heater, the cab heater and the coolant passage of said liquid coolant heated anti-icing device in series so that the valve which regulates the flow of liquid coolant to the cab heater also regulates the flow of liquid coolant to the anti-icing device, said anti-icing device comprising a conductive metal spacer body secured to the carburetor downstream of the carburetor venturi and being disposed between and secured to the carburetor and to said intake manifold so that heat from the anti-icing device will be conducted upstream against the flow of the fuel air mixture in amounts sufficient to prevent icing when the anti-icing device has been heated to a temperature not exceeding that normally existing in the cooling system of a liquid coolant cooled internal combustion engine.

3. In a motor vehicle, a liquid coolant cooled internal combustion engine, an intake manifold, a carburetor, a liquid coolant heated anti-icing device, provided with a liquid coolant passage, a liquid coolant operated cab heater, a valve for the regulation of the flow of liquid coolant from the engine to the cab heater, and means connecting the cooling passages of the liquid coolant cooled internal combustion engine, the valve for the regulation of the flow of the liquid coolant to the cab heater, the cab heater and the coolant passage of said liquid coolant heated anti-icing device being connected in series so that the valve which regulates the flow of liquid coolant to the cab heater also regulates the flow of liquid coolant to the anti-icing device, said anti-icing device comprising a heat conductive metal spacer provided with a bore for the passage of the fuel air mixture and said passage for liquid coolant and being secured to the carburetor downstream of the carburetor venturi and being disposed between and secured to the carburetor and to said intake manifold so that heat from the anti-icing device will be conducted upstream against the flow of the fuel air mixture in amounts sufficient to prevent icing when the anti-icing device has been heated to a temperature not exceeding that normally existing in the cooling system of a liquid coolant cooled internal combustion engine.

4. In a motor vehicle according to claim 1 in which the anti-icing device comprises: a first disk formed from a material having a high thermal conductivity and having a surface portion sealingly engaged with the carburetor, a second disk formed from a material of a low thermal conductivity and having a surface portion sealingly engaged with the intake manifold, said first and second disks having complementary portions for sealingly engaging each other, each of said disks having a bore for the passage of an air fuel mixture, each of said disks having a portion of said coolant passage formed in the complementary surface portion whereupon the sealing engagement of the complementary surface portions of the disks form a complete coolant passage between the two disks, the flow of liquid coolant through said coolant passage heating by conduction the first disk and associated carburetor structure adjacent to said first disk.

References Cited by the Examiner
UNITED STATES PATENTS 2,028,069  1/1936  Horton.
2,507,643  5/1950  Oaks.
2,864,355  12/1958  Woodworth _____ 123—122

WILLIAM F. O'DEA, *Primary Examiner.*

CHARLES SUKALO, *Examiner.*